| (12) | United States Patent | (10) Patent No.: US 10,340,747 B2 |
|---|---|---|
| | Byun et al. | (45) Date of Patent: *Jul. 2, 2019 |

(54) POWER TRANSMITTING METHOD AND POWER TRANSMITTER FOR COMMUNICATION WITH POWER RECEIVER

(71) Applicant: Samsung Electronics Co., Ltd., Gyeonggi-do (KR)

(72) Inventors: Kang-Ho Byun, Gyeonggi-do (KR); Kyung-Woo Lee, Gyeonggi-do (KR); Young-Min Lee, Gyeonggi-do (KR); Se-Ho Park, Gyeonggi-do (KR); Yu-Su Kim, Gyeonggi-do (KR); Sung-Ku Yeo, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/184,506

(22) Filed: Nov. 8, 2018

(65) Prior Publication Data

US 2019/0081513 A1 Mar. 14, 2019

Related U.S. Application Data

(63) Continuation of application No. 15/654,316, filed on Jul. 19, 2017, now Pat. No. 10,128,690, which is a (Continued)

(30) Foreign Application Priority Data

May 17, 2011 (KR) ........................ 10-2011-0046395

(51) Int. Cl.
*H02J 50/12* (2016.01)
*H02J 5/00* (2016.01)
(Continued)

(52) U.S. Cl.
CPC ............. *H02J 50/12* (2016.02); *B60L 11/182* (2013.01); *B60L 53/12* (2019.02); *H02J 5/005* (2013.01);
(Continued)

(58) Field of Classification Search
CPC . H02J 7/025; H02J 5/005; H02J 17/00; H04B 5/0037; B60L 11/182; Y02T 90/122
See application file for complete search history.

(56) References Cited

U.S. PATENT DOCUMENTS

| 5,367,242 A | 11/1994 | Hulman |
|---|---|---|
| 2004/0145342 A1 | 7/2004 | Lyon |

(Continued)

FOREIGN PATENT DOCUMENTS

| CN | 101335470 | 12/2008 |
|---|---|---|
| CN | 101436791 | 5/2009 |

(Continued)

OTHER PUBLICATIONS

European Search Report dated Apr. 8, 2015 issued in counterpart application No. 12786583.0-1804.

(Continued)

*Primary Examiner* — Andrew W Bee
(74) *Attorney, Agent, or Firm* — The Farrell Law Firm, P.C.

(57) ABSTRACT

A method and power transmitter for efficiently controlling power transmission to one or more power receivers in a wireless multi-power transmission system are provided. The method includes performing, when a predetermined measurement cycle arrives, a load measurement; comparing a current load measurement value with a previous load measurement value; determining whether the current load measurement value is increased over the previous load measurement value by at least as much as a first predetermined (Continued)

threshold; gradually increasing, when the load measurement value is increased over the previous load measurement value by at least as much as the first threshold, a transmission power value until a request for a subscription to a wireless multi-power transmission network from a power reception target within a predetermined time limit; and stopping, when the request for the subscription is not received before the time limit is exceeded, power transmission to the power reception target.

15 Claims, 10 Drawing Sheets

Related U.S. Application Data continuation of application No. 13/473,062, filed on May 16, 2012, now Pat. No. 9,735,623.

(51) Int. Cl.
| | |
|---|---|
| *H04B 5/00* | (2006.01) |
| *H02J 7/02* | (2016.01) |
| *H02J 50/80* | (2016.01) |
| *H02J 50/40* | (2016.01) |
| *H02J 50/60* | (2016.01) |
| *H02J 17/00* | (2006.01) |
| *B60L 53/12* | (2019.01) |
| *B60L 11/18* | (2006.01) |

(52) U.S. Cl.
CPC .............. *H02J 7/025* (2013.01); *H02J 17/00* (2013.01); *H02J 50/40* (2016.02); *H02J 50/60* (2016.02); *H02J 50/80* (2016.02); *H04B 5/0037* (2013.01)

(56) References Cited

U.S. PATENT DOCUMENTS

| | | |
|---|---|---|
| 2009/0001932 A1 | 1/2009 | Kamijo et al. |
| 2009/0096413 A1 | 4/2009 | Partovi et al. |
| 2009/0127936 A1 | 5/2009 | Kamijo et al. |
| 2009/0133942 A1 | 5/2009 | Iisaka |
| 2009/0174264 A1 | 7/2009 | Onishi et al. |
| 2009/0174364 A1 | 7/2009 | Onishi et al. |
| 2009/0224723 A1 | 9/2009 | Tanabe |
| 2010/0039066 A1 | 2/2010 | Yuan et al. |
| 2010/0084918 A1 | 4/2010 | Fells et al. |
| 2010/0201316 A1 | 8/2010 | Takada et al. |
| 2011/0025264 A1 | 2/2011 | Mochida et al. |
| 2011/0231029 A1 | 9/2011 | Ichikawa |
| 2011/0285210 A1 | 11/2011 | Lemmens et al. |
| 2012/0001485 A1 | 1/2012 | Uchida |
| 2012/0200158 A1 | 8/2012 | Takei |
| 2013/0285603 A1 | 10/2013 | Zeinstra |

FOREIGN PATENT DOCUMENTS

| | | |
|---|---|---|
| EP | 0 533 247 | 3/1993 |
| GB | 2 472 700 | 2/2011 |
| JP | 2007-088743 | 4/2007 |
| JP | 2009-011129 | 1/2009 |
| JP | 2009-044826 | 2/2009 |
| JP | 2009-189230 | 8/2009 |
| JP | 2009-219177 | 9/2009 |
| JP | 2011-072097 | 4/2011 |
| KR | 1020100091112 | 8/2010 |
| KR | 1020100094596 | 8/2010 |
| KR | 1020100128395 | 12/2010 |
| WO | WO 2009/122470 | 10/2009 |
| WO | WO 2010/040015 | 4/2010 |
| WO | WO 2010/085701 | 7/2010 |
| WO | WO 2011/042974 | 4/2011 |

OTHER PUBLICATIONS

Chinese Office Action dated Apr. 29, 2015 issued in counterpart application No. 201280024146.9.

Highly Integrated Wireless Receiver Qi (WPC v1.1) Compliant Power Supply, Copyright 2013 Texas Instruments Incorporated, pp. 34.

Japanese Office Action dated Mar. 14, 2016 issued in counterpart application No. 2014-511299, 9 pages.

Japanese Office Action dated Oct. 31, 2016 issued in counterpart application No. 2014-511299, 10 pages.

POWER TRANSMITTING METHOD AND POWER TRANSMITTER FOR COMMUNICATION WITH POWER RECEIVER

PRIORITY

This application is a Continuation of application Ser. No. 15/654,316, filed with the U.S. Patent and Trademark Office on Jul. 19, 2017, which is a Continuation of application Ser. No. 13/473,062, filed with the U.S. Patent and Trademark Office on May 16, 2012, now U.S. Pat. No. 9,735,623, and claims priority under 35 U.S.C. § 119(a) to Application No. 10-2011-0046395 filed with the Korean Industrial Property Office on May 17, 2011, the entire contents of each of which are incorporated herein by reference.

BACKGROUND OF THE INVENTION

1. Field of the Invention

The present invention relates generally to a wireless power transmission system, and more particularly, to a power transmitting method for communication with a power receiver in a wireless multi-power transmission system.

2. Description of the Related Art

A wireless power transmission system typically includes a power transmitter and a power receiver. Power transmission between the power transmitter and the power receiver is configured such that power is transferred between a first coil of the power transmitter and a second coil of the power receiver. Such a configuration is commonly used in various power transmission systems.

A communication technique used in the wireless power transmission system having the above configuration may be divided into two schemes. One such scheme is an In-Band communication scheme that performs communication through a coil that transfers power, and the other such scheme is an Out-Band communication scheme that performs communication through a communication end that is separate from the coil that is transferring power.

The wireless power transmission system employing such wireless charging technologies includes a power transmitter in a form of a power supplying supporter, and is configured such that the power transmitter supplies power to the power receiver such as a mobile terminal. A wireless power transmission system can also be configured such that wireless charging between power receivers is possible by sharing a battery installed in the power receiver even without the power supplying supporter. As described above, when the wireless charging between the power receivers is possible, the power receivers can be operated without power transferred from the power transmitter. However, most power receivers are operated by power received from the power transmitter such as the power supplying supporter.

However, when the power receiver is operated by power supplied from the power transmitter while performing communication according to the Out-Band communication scheme, if sufficient power is not supplied from the power transmitter, the power receiver may not operate normally. For example, when the power receiver is not fully located within an effective area where the power receiver can receive power transferred from a nearby power transmitter, or when a plurality of power receivers are located in the effective area so as to share power for communication from the power transmitter at the same time, it may not be possible for all power receivers to obtain equal charging efficiency and power transmission efficiency is also deteriorated. Accordingly, some of or all of the power receivers may not receive sufficient power.

Accordingly, a power receiver that does not normally receive sufficient power may not be able to perform communication. When the power transmitted is not sufficient to perform communication with the power receiver, the power transmitter does not supply power to the power receiver and may not recognize the power receiver as a valid receiver.

SUMMARY OF THE INVENTION

The present invention has been made to address at least the above problems and/or disadvantages and to provide at least the advantages described below. In order to address the problem occurring due to insufficient power supplied to the power receiver, an aspect of the present invention is to provide a power transmitting method and a power transmitter for efficiently supplying power to a power receiver.

According to another aspect of the present invention provides a method of controlling power transmission of a wireless power transmitter is provided, with the method including transmitting, by a resonator, first power for detecting a change of impedance; in response to detecting the change of impedance, transmitting, by the resonator, second power for communicating with a wireless power receiver; increasing the second power from a first magnitude to a second magnitude, wherein the second magnitude is greater than the first magnitude; receiving, by a wireless communication unit, a search signal from the wireless power receiver while transmitting the second power; in response to receiving the search signal, transmitting, by the wireless communication unit, a connection request signal to the wireless power receiver; and transmitting, by the resonator, third power to the wireless power receiver for charging the wireless power receiver.

In accordance with another aspect of the present invention, a wireless power transmitter for controlling power transmission is provided that includes a resonator; a wireless communication unit configured to perform wireless communication, and a controller configured to control the resonator to transmit first power for detecting a change of impedance; control the resonator to, in response to detecting the change of impedance, transmit second power for communicating with a wireless power receiver; control the resonator to increase the second power from a first magnitude to a second magnitude, wherein the second magnitude is greater than the first magnitude; control the wireless communication unit to receive a search signal from the wireless power receiver; control the wireless communication unit to, in response to receiving the search signal, transmit a connection request signal to the wireless power receiver; and control the resonator to transmit third power to the wireless power receiver for charging the wireless power receiver.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Hereinafter, embodiments of the present invention are described with reference to the accompanying drawings. In the following description and the accompanying drawings, a detailed description of known functions and configurations incorporated herein may be omitted to avoid obscuring the subject matter of the present invention.

According to an embodiment of the present invention, a method of efficiently controlling power transmission to one or more power receivers in the wireless multi-power transmission system is provided. To this end, the method includes performing a load measurement when a predetermined measurement cycle arrives, comparing a load measurement value according to the load measurement with a previous load value; determining whether the load measurement value is increased by a first threshold or more from the previous load value, when the load measurement value is increased by the first threshold or more from the previous load value, gradually increasing a transmission power value until a request for a subscription to a wireless multi-power transmission network from a target of power reception within a predetermined time limit, and, when the request for the subscription is not received until the time limit is exceeded, stopping the power transmission to the target of power reception.

Herein, invalid material is defined as a material that receives, when a power transmitter transmits power, power intended for other power receivers. Examples of invalid material may include a metal material, an electronic device that does not perform communication with the power transmitter, and a power receiver to which the power transmitter does not intend to transmit the power. In the following description, such an invalid material may also be referred to as a non-target of power reception.

Hereinafter, a configuration of a wireless power transmission system according to an embodiment of the present invention is described with reference to FIG. 1.

Figure 1:
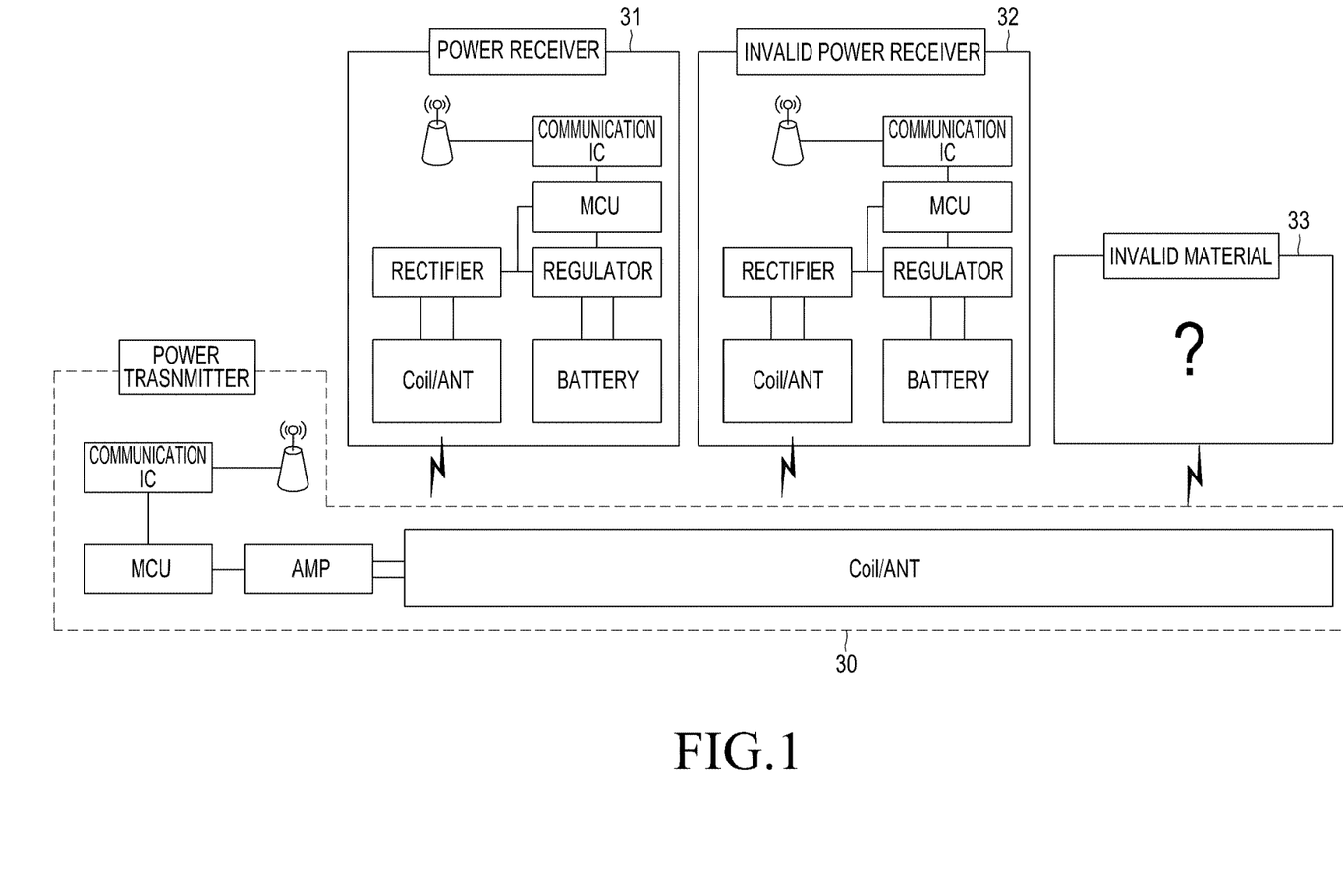
FIG. 1 is diagram illustrating a configuration of a wireless multi-power transmission system according to an embodiment of the present invention.

Referring to FIG. 1, a power transmitter 30 detects that the presence of a target to receive power on a charging deck by using a load detection function, and can transmit wireless power to one or more power receivers. The power transmitter 30 and a power receiver 31 perform communication with each other through a communication system separate from the wireless power transmission system.

When the power receiver 31 is located within an effective range of a first coil of the power transmitter 30, that is, in an effective charging area, a value of a voltage (or current) measured in the first coil of the power transmitter 30 is changed. That is, a measured voltage value is changed by a change in a load. However, when an invalid power receiver 32 or an invalid material 33 is located within the effective range of the first coil of the power transmitter 30, the same phenomenon may be also generated.

Figure 2:
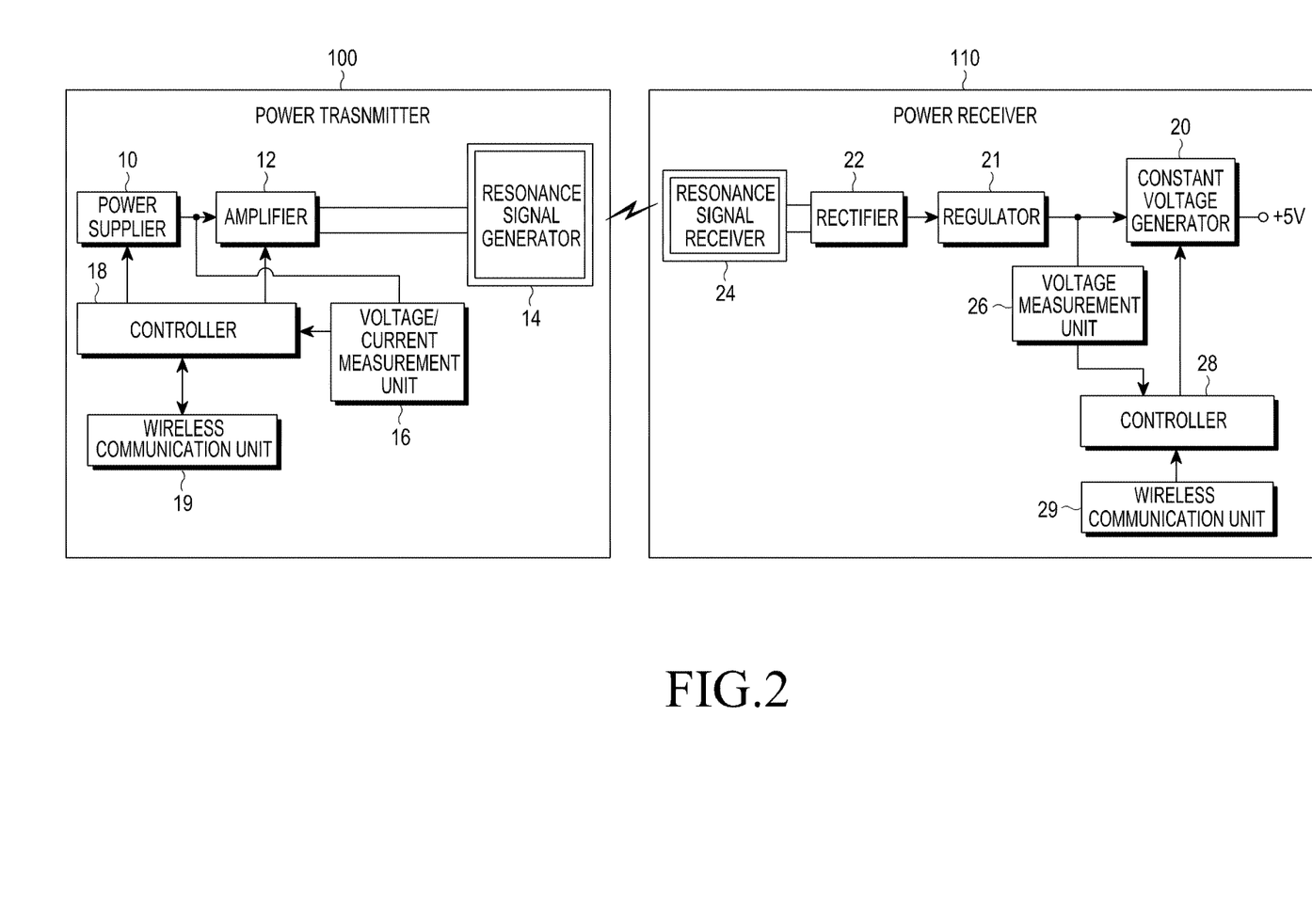
FIG. 2 is a block diagram illustrating a power transmitter and a power receiver in a wireless multi-power transmission system according to an embodiment of the present invention.

The components in FIG. 1 according to embodiments of the present invention are described in detail herein with reference to FIG. 2.

Due to power transmission to a non-target of intended power reception, the efficiency of the power transmission is deteriorated and a breakdown by an overload or an accident by overheating may be generated. Accordingly, in order to guarantee the safety of the wireless power transmission system it is necessary to stop the power transmission to the non-target of the intended power reception.

As described above, an embodiment of the present invention provides a wireless power transmission system including the power transmitter having a function of transmitting wireless power to a plurality of power receivers and power receivers having a function of receiving wireless power. According to such an embodiment of the present invention, even though one or more targets of charging are located in the effective charging area, power can be transmitted to only an effective target of power reception among the multiple targets of charging.

A power transmission method for communication with one or more targets of power reception according to an embodiment of the present invention is described as follows with reference to FIG. 2.

FIG. 2 is a block diagram illustrating insides of a power transmitter and a power receiver included in a wireless power transmission system of FIG. 1 according to an embodiment of the present invention.

Referring to FIG. 2, a power transmitter 100 includes a power supplier 10, an amplifier 12, a resonance signal generator 14, a voltage/current measurement unit 16, a controller 18, and a wireless communication unit 19. The power supplier 10 supplies power in a manner that generates a resonance frequency signal determined by a controller 18. The power supplier 10 may include a Voltage Control Oscillator (VOC), for example. The amplifier 12 amplifies the signal generated by the power supplier 10 to a signal of a high output according to power applied from the power supplier 10. The resonance signal generator 14 transmits power from the power supplier 10 to one or more power receivers through a wireless resonance signal according to the signal of the high output generated by the amplifier 12. The voltage/current measurement unit 16 measures a voltage and a current generated by the power supplier 10. The controller 18 generally controls a wireless power transmission operation of the power transmitter 100, and in particular, controls operations of the power supplier 10 and the amplifier 12 to maintain a preset value within a normal range by monitoring a voltage and a current of a resonance signal wirelessly transmitted according to the current and the voltage detected by the voltage/current measurement unit 16. The wireless communication unit 19 is configured by applying one selected scheme among various wireless short-distance communication schemes such as Bluetooth, for example, for communication with a power receiver 110 in connection with the wireless power transmission operation under a control of the controller 18. Here, the resonance signal generator 14 includes a charging substrate that can place the power receiver above the resonance signal generator 14.

After detecting a change in a load and when the load measurement value is increased over the previous load measurement value by at least as much as the first threshold, the controller 18 controls a gradual increase of a transmission power value until a request for a subscription to a wireless multi-power transmission network from a power reception target within a predetermined time limit, and stops transmission of the power to a power reception target when the request for the subscription is not received before the time limit is exceeded.

The controller 18 of the power transmitter 100 may include a Micro Controller Unit (MCU) and/or other similar components (not shown). An operation for controlling power transmission to one or more power receivers according to the present invention is described in detail herein with reference to FIGS. 4 and 5.

Meanwhile, the power receiver 110 includes a resonance signal receiver 24, a rectifier 22, a regulator 21, a constant voltage generator 20, a voltage measurement unit 26, a controller 28, and a wireless communication unit 29. The resonance signal receiver 24 receives the wireless resonance signal transmitted from the resonance signal generator 14. The rectifier 22 rectifies an Alternating Current (AC)-type power source received by the resonance signal receiver 24 to a Direct Current (DC)-type power source. The regulator 21 regulates the DC power source rectified by the rectifier 22. The constant voltage generator 20 converts a power source output from the regulator 21 to an operation power source (e.g. +5 V) desired by a portable terminal and the like to which a corresponding power receiver is applied. The voltage measurement unit 26 measures an input voltage. The controller 28 for generally controls a wireless power reception operation of the power receiver 110, determines a power reception state according to a detected signal of a constant voltage detector 26, and provides information on the power reception state. The controller 28 of the power receiver also may include an MCU and/or other similar components.

The wireless communication unit 29 is configured by applying one selected scheme among various wireless short-distance communication schemes for communication with the power transmitter 100 in connection with the wireless power reception operation under a control of the controller 28. The wireless communication unit 29 can transmit and receive various types of information pieces and messages required in a wireless charging process through wireless short-distance communication under the control of the controller 28.

Figure 3A:
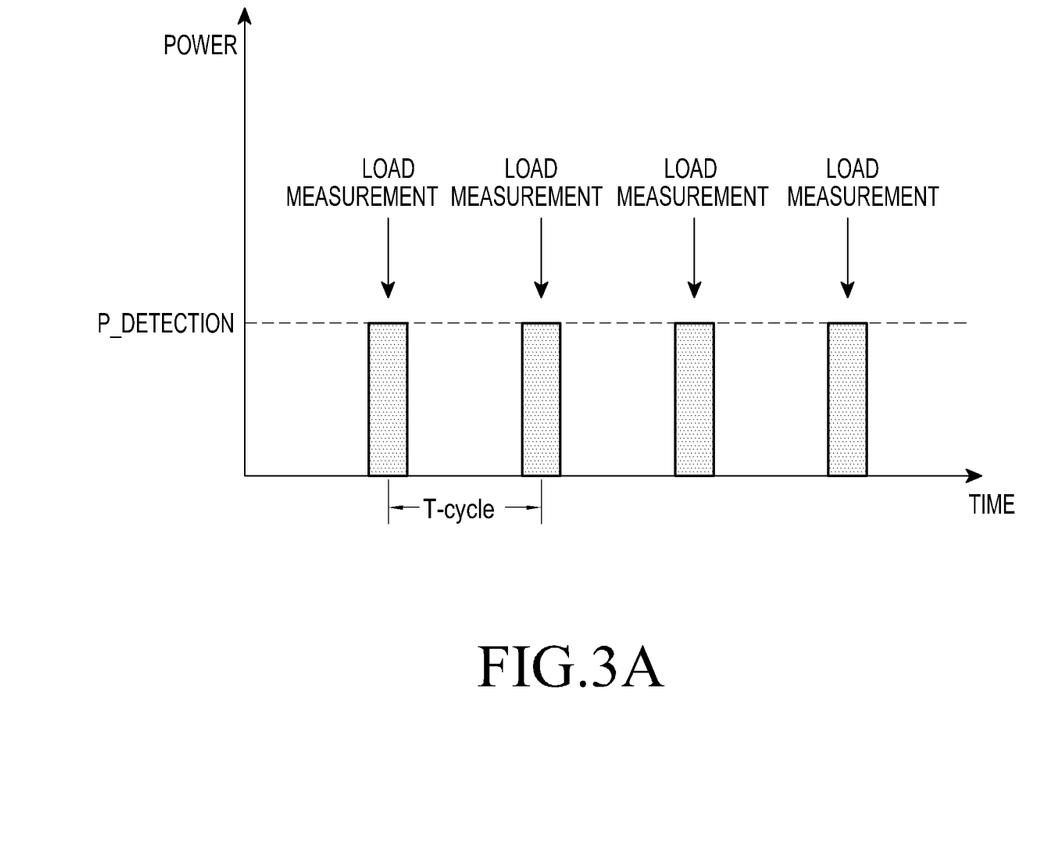
FIG. 3A is a diagram illustrating an operation for periodic load detection of a power transmitter when there is no power receiver receiving power from the power transmitter.

The aforementioned power transmitter 100 performs a load measurement based on a predetermined measurement cycle (T_cycle) as shown in FIG. 3A. Such a measurement cycle corresponds to a time interval for detecting a change in a load by the power transmitter 100. FIG. 3A illustrates an example of a load measurement when there is no power receiver in an effective charging area of the power transmitter 100. As shown in FIG. 3A, the power transmitter 100 transmits power having a predetermined size in order to detect whether there is a change in a load based on a predetermined measurement cycle. Power corresponding to this load detection is referred to as "P_detection".

As explained above, FIG. 3A illustrates an example where there is no power receiver for receiving power from the power transmitter 100. Accordingly, the power transmitter 100 does not transmit power before a next measurement cycle after transmitting the load detection power for the load measurement.

Figure 3B:
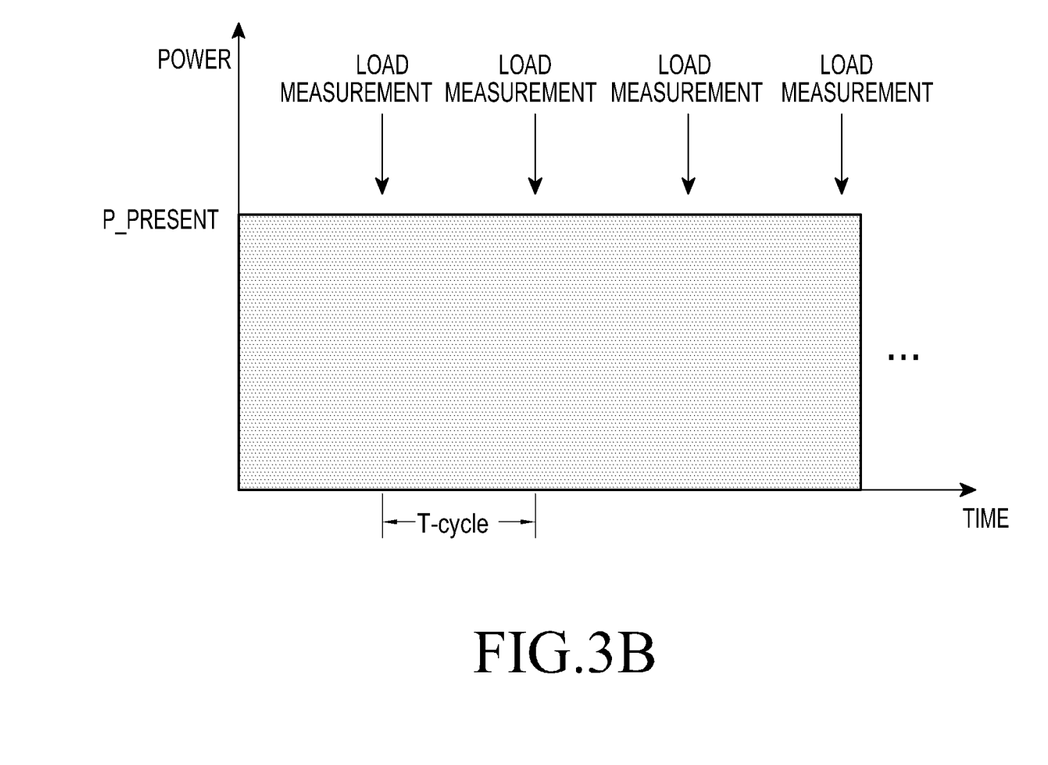
FIG. 3B is a diagram illustrating an operation for periodic load detection of a power transmitter when there is a power receiver receiving power from the power transmitter.

FIG. 3B illustrates an example of a load measurement where the power transmitter 100 is transmitting power to the power receiver 110 located in the effective charging area. An amount of power being currently transmitted to the power receiver 110 is referred to as "P_present". The power transmitter 100 performs a load measurement based on a predetermined measurement cycle, even while transmitting the size of current transmission power (P_present) to the power receiver 110. In detail, the current transmission power (P_present) refers to power transmitted by the power transmitter 100 for the power receiver 110 that is already receiving power. The load detection power (P_detection) may be less than the current transmission power (P_present) for charging since the load detection power (P_detection) is a minimum power used to determine whether the power receiver is present.

Figure 4:
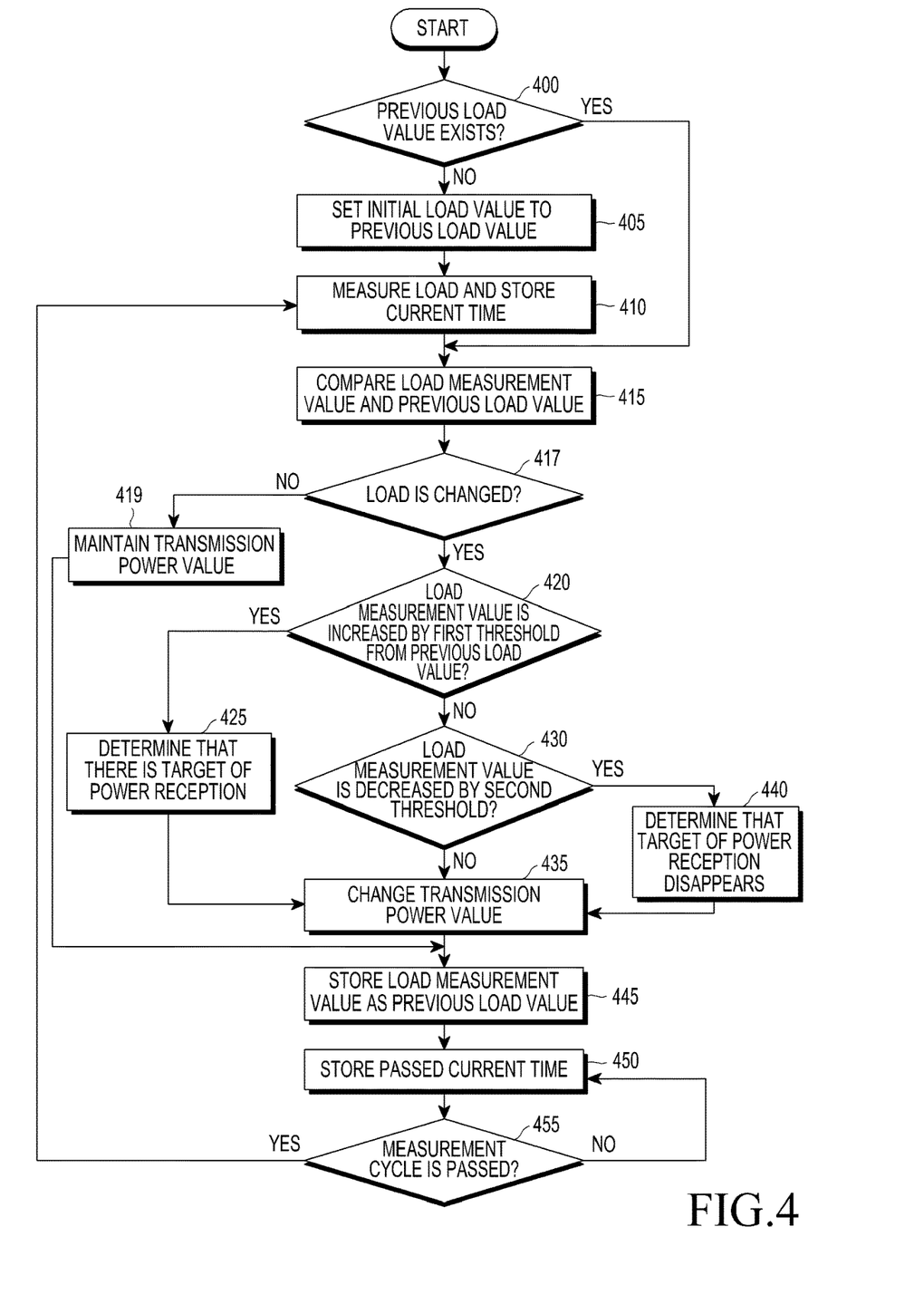
FIG. 4 is a flowchart illustrating an operation for periodic load detection by a power transmitter.

A process of the load measurement is described in detail as follows with reference to FIG. 4. FIG. 4 is a flowchart illustrating an operation for periodical load detection by a power transmitter.

Referring to FIG. 4, in step, 400, the power transmitter 100 determines whether a load value has been previously stored through a previous measurement. Herein, a previous load value refers to a load value that is set in a previous step and maintained by the power transmitter 100. If there is no previous load value, an initial load value is set to the previous load value in step 405. Herein, a parameter indicating the previous load value is referred to as "D_before" and a parameter indicating the initial load value is referred to as "D_Init", and "D_before" is substituted with "D_Init". Herein, the initial load value (D_Init) is a load value measured while the power transmitter 100 transmits power having a same size as the current transmission power (P_present) through a first coil when there is no object adjacent to the power transmitter 100. The initial load value (D_Init) is a value measured by converting a sine wave of the first coil to a DC-type sine wave, and the initial load value (D_Init) may be a peak value of a voltage applied to the first coil or may include electrical properties that can be measured through the first coil among frequencies of the first coil.

Subsequently, the power transmitter 100 stores a current time at which the load is measured in step 410. The load is measured by converting a sine wave applied to the first coil to a sine wave corresponding to direct current, and accordingly a load measurement value is obtained. Here, a parameter indicating the load measurement value is referred to as "D_measure", and a parameter indicating the current time is referred to as "T_det_now".

The power transmitter 100 compares the previous load value (D_before) and the load measurement value (D_measure) in step 415. Through a result of the comparison, the power transmitter 100 determines whether there is a change in the load, in step 410. Specifically, the power transmitter 100 determines whether a difference between the load value (D_before) and the load measurement value (D_measure) is within a margin of error by considering a communication environment between the load value (D_before) and the load measurement value (D_measure). If the load value (D_before) and the load measurement value (D_measure) are the same (i.e., if the difference between the two values is within the margin of error), the power transmitter 100 proceeds to step 419 and thus determines that no target of power reception has newly entered and maintains a transmission power value. For example, when a power receiver that is already being charged is present in the effective charging area as shown in FIG. 3B, a current transmission power value is maintained. When there is no power receiver in the effective charging area, a transmission power value corresponding to "0" is maintained as shown in FIG. 3A. Further, when the power transmitter 100 determines that there is no target of power reception that newly or additionally enters the effective charging area, the power transmitter 100 proceeds to step 445.

Meanwhile, if the power transmitter 100 determines that there is the change in the load in step 417, the power transmitter 100 determines whether the load measurement value is increased by at least first threshold from the previous load value in step 420. If the load measurement value is increased by at least the first threshold from the previous load value, the power transmitter 100 proceeds to step 425, and determines that the target of power reception is located in the effective charging area. More specifically, the power transmitter 100 determines that a load change higher than the first threshold is generated due to the target of power reception. Accordingly, the power transmitter 100 changes the transmission power value for power transmission to the power receiver in step 435.

If the load measurement value is not increased by at least the first threshold from the previous load value in step 420, the power transmitter 100 determines whether the load measurement value is decreased by at least a second threshold from the previous load value in step 430. If the load measurement value is decreased by at least the second threshold from the previous load value, the power transmitter 100 proceeds to step 440, and determines that the target of power reception has disappeared. Then, the power transmitter 100 changes the transmission power value in step 435. More specifically, the power transmitter 100 stops transmitting power to the target of power reception.

Thereafter, the power transmitter 100 stores the load measurement value as the previous load value in step 445. Accordingly, D_before=D_measure. A passed current time (i.e., new current time for determining time that has passed since the current time was previously measured and stored in step 410) is stored in step 450. Here, a parameter indicating the passed current time is defined as "T-det_after". Further, the power transmitter 100 determines whether a measurement cycle is passed in step 455. Whether the measurement cycle is passed is determined using an equation of "T_det_now+T_cycle≤T_det_after".

If it is determined that the measurement cycle is not passed in step 455, the power transmitter 100 returns to step 450 and stores a current time passed from the current time stored in step 410 in order to determine whether the measurement cycle is passed. If it is determined that the measurement cycle is passed in step 455, the power transmitter 100 returns to step 410 and performs the load measurement according to a next measurement cycle. As described above, the load measurement is performed during each measurement cycle by repeating steps 410 to 455.

Figure 5:
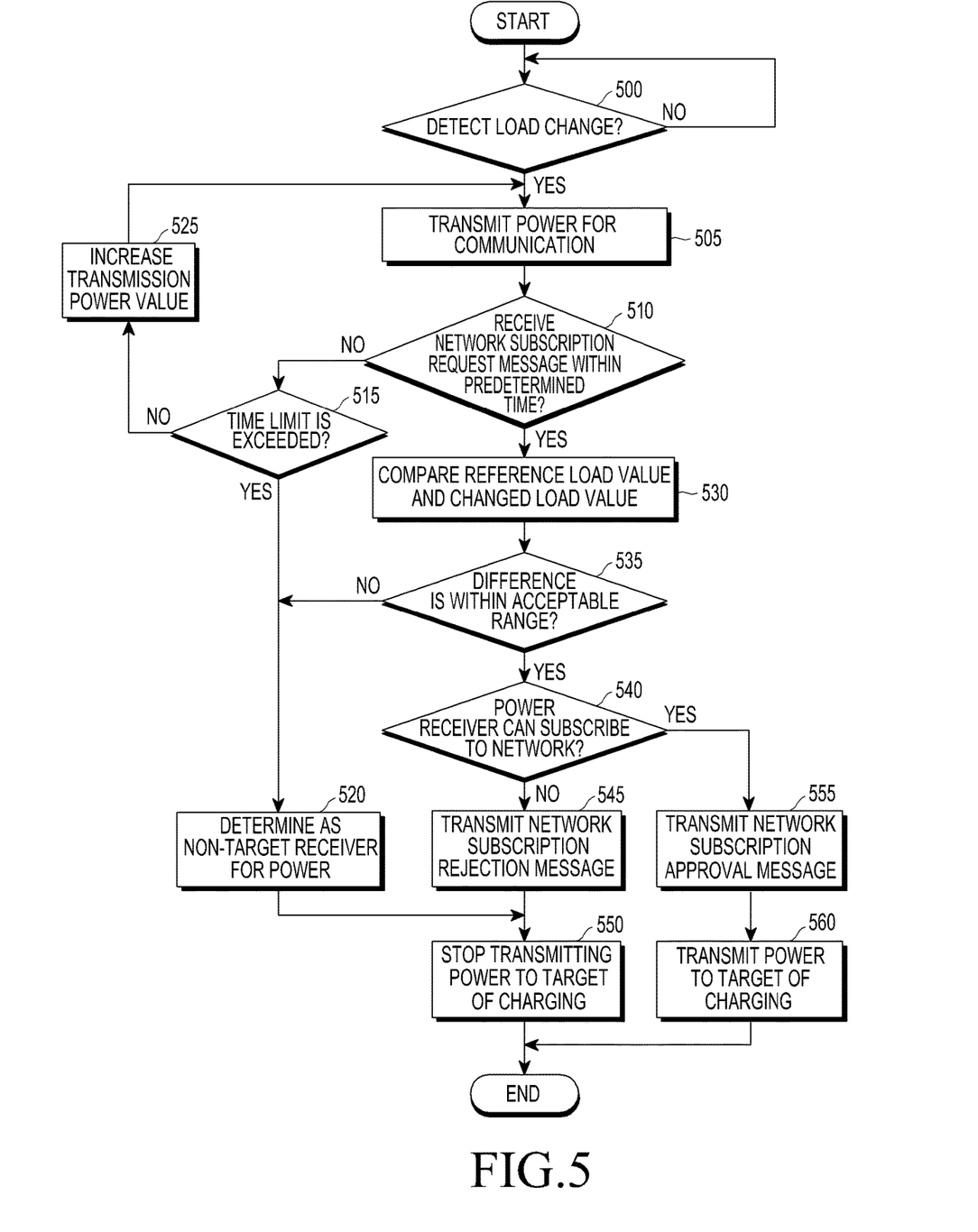
FIG. 5 is a flowchart illustrating an operation for a process of changing a power transmission value after a load detection by a power transmitter according to an embodiment of the present invention.

Hereinafter, a process of changing the power transmission value in the power transmitter 100 is described as follows with reference to FIG. 5. FIG. 5 is a flowchart illustrating an operation for a process of changing a power transmission value after a load detection by a power transmitter according to an embodiment of the present invention.

Figure 6A:
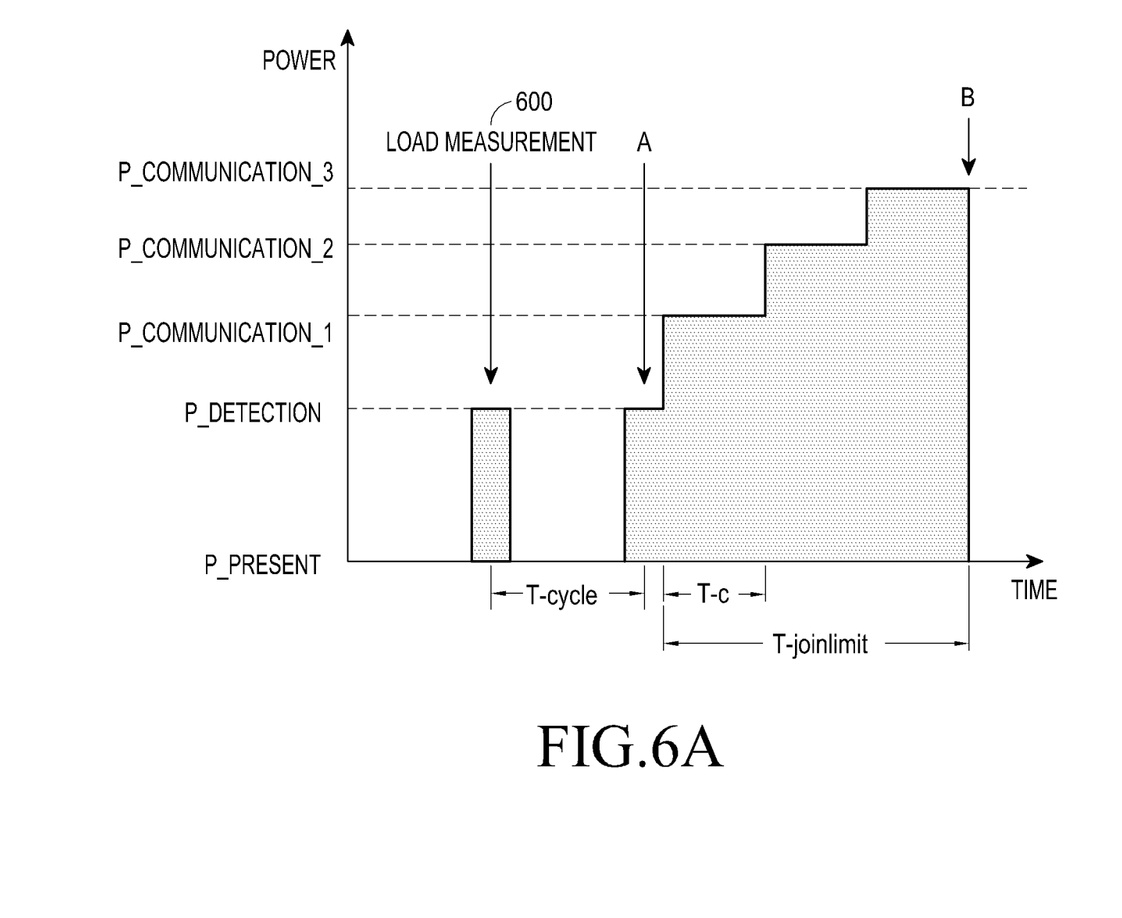
FIGS. 6A and 6B are diagrams illustrating an operation of changing a power transmission value when a target of power reception is detected in a state where there is no power receiver according to an embodiment of the present invention.
Figure 6B:
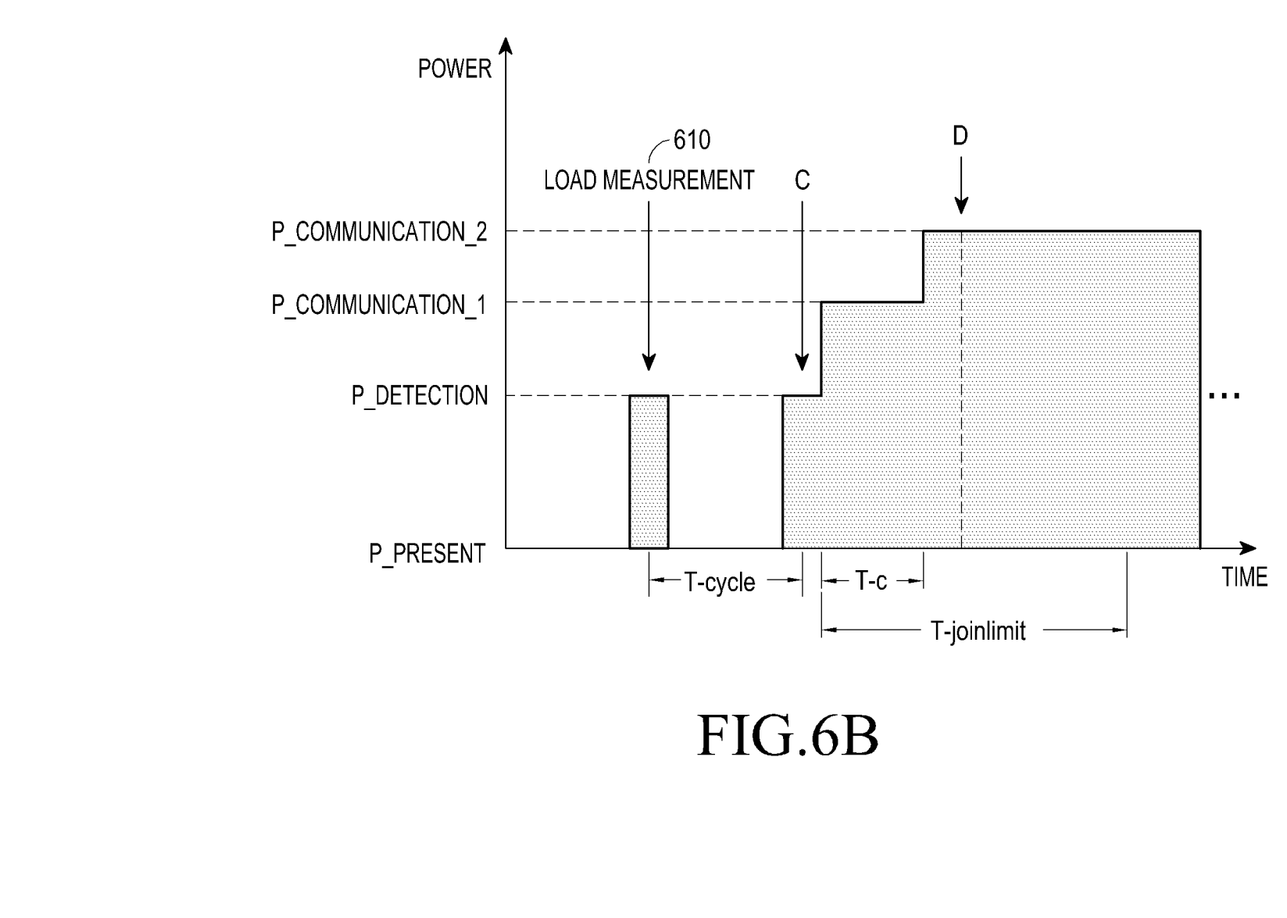

FIG. 5 corresponds to an operation process performed after a determination that there is the target of power reception when the load measurement value is increased by at least the first threshold. For better understanding, the following description according to an embodiment of the present invention also refers to FIGS. 6A and 6B. FIGS. 6A and 6B are diagrams illustrating an operation of changing a power transmission value when a target of power reception is detected in a state where there is no power receiver according to an embodiment of the present invention.

First, the power transmitter 100 transmits power having a size of load detection power (P_present) to detect a load and performs a load measurement 600 as shown in FIG. 6A. Here, a detection of the load change is implemented through the same process as that described with reference to FIG. 4.

Accordingly, if the load change is detected in step 500, the power transmitter 100 transmits power for communication in step 505. Upon a determination that a target of charging which can receive power at a time point of A within the measurement cycle (T_cycle) is located in the effective charging area after the load measurement, the power transmitter 100 performs power transmission for communication with the target of charging. Accordingly, the power transmitter 100 transmits power having a size of first communication power (P_communication_1), as shown in FIG. 6A. Here, the first communication power (P_communication_1) refers to a quantified power value with which the controller 28 and the wireless communication unit 29 within the power receiver can be operated.

The power receiver, which is the target of charging that has received power, transmits a network subscription request message for a subscription to a network. Here, wireless multi-power transmission is achieved, and the network is defined as a configuration including at least one power receiver and the power transmitter for transmitting power to the plurality of power receivers.

In step 510, the power transmitter 100 determines whether the network subscription request message is received from the target of charging within a predetermined time. Here, the predetermined time corresponds to "T_c" in FIG. 6A, and refers to a time during which the power transmitter 100 waits for the network subscription request message while transmitting predetermined power, i.e., the first communication power (P_communication_1) for communication with the target of charging.

If the network subscription request message is not received within the predetermined time, the power transmitter 100 determines whether a time limit is exceeded in step 515. Here, the time limit corresponds to "T_joinlimit" in FIG. 6A. If it is determined that the time limit is not exceeded in step 515, step 525 is performed and the power transmission value is increased. At this time, the network subscription request message is not received within the predetermined time (T_c) that does not exceed the time limit (T_joinlimit), because insufficient power is supplied to the target of charging and thus no communication is performed, so that the transmission power value is increased. Accordingly, the power transmitter 100 increases the current transmission power value corresponding to the size of the first communication power (P_communication_1) to a transmission power value having a size of second communication power (P_communication_2) as shown in FIG. 6A. Next, if the network subscription request message is not still received, even though the increased transmission power value, the power transmitter 100 further increases the transmission power value from the size of the second communication power (P_communication_2) to a transmission power value having a size of third communication power (P_communition_3). In this process, a difference between the first communication power (P_communication_1) and the second communication power (P_communication_2)

and a difference between the second communication power (P_communication_2) and the third communication power (P_communition_3) are determined through division into predetermined units within a maximum transmission power value.

Thereafter, if the network subscription request message is not received until the time limit (T_joinlimit) is exceeded, the power transmitter 100 determines the target of charging as the non-target of power reception in step 520. As shown in FIG. 6A, if the network subscription request message is not received even though the transmission power value is increased to the transmission power value in a range of the size of the first communication power (P_communication_1) to the size of the third communication power (P_communition_3), the power transmitter 100 determines the target of charging as the non-target of power reception in a time point at which the time limit (T_joinlimit) is exceeded, that is, a time point of B.

For example, although the invalid material such as a metal material can generate a voltage value or a current value measured in the power transmitter 100 change, the invalid material cannot respond to power transmission of the transmitter 100, since the invalid material cannot perform communication. More specifically, the invalid material cannot inform the transmitter that the invalid material is an effective power receiver. Accordingly, the invalid material or the ineffective power receiver cannot transmit the network subscription request message even though the time limit is exceeded. The power transmitter 100 considers that the communication has not been performed when the network subscription request message has not been received, so that the power transmitter 100 determines the target of charging that has generated the load change is a non-target of power reception, i.e., the power transmitter 100 determines that the load change has been generated by the invalid material.

However, if the network subscription request message is received within the time limit (T_joinlimit) in step 510, the power transmitter 100 compares a reference load value and a changed load value obtained through the load detection in step 530. FIG. 6B illustrates an example where the network subscription request message is received at a time point of D when the power transmitter transmits a transmission power value having a size of the first communication power (P_communication_1), since the power transmitter determines that there is a target of charging that can receive power at a time point of C after the load measurement 610 and then the power transmitter increases the transmission power value to a transmission power value having a size of the second communication power (P_communication_2).

At this time, the network subscription request message includes initial information for informing the transmitter that the power receiver is a target of charging and an effective power receiver. The initial information contains an ID of the power receiver, a protocol version, a reference load value in the power receiver, and a reference efficiency value in the power receiver. Accordingly, the power transmitter 100 sets a reference load value by reflecting the reference load value of the power receiver contained in the network subscription request message in order to know a load value changed when the power receiver is located in the effective charging area. For example, if a measurement value when there is no power receiver in the effective charging area of the power transmitter 100 is A and a measurement value changed as the power receiver is located in the effective charging area is B, a value quantified from the changed measurement value, for example, a difference between A and B or B is defined as a reference load.

The power transmitter determines whether a result of the comparison between the reference load value and the changed load value is within an acceptable range in step 535. Here, the acceptable range may be a range based on a reference change value, and, in this case, it can be determined whether the changed load value is within the acceptable range.

If the result of the comparison exceeds the acceptable range in step 535, the power transmitter 100 proceeds to step 520 and the power transmitter 100 determines that the power receiver having transmitted the network subscription request message can perform communication but determines the power receiver as the non-target of power reception which is not suitable for performing wireless charging with the power transmitter 100. For example, the power transmitter 100 determines the power receiver is a device that cannot perform wireless charging set by a manufacturer or a regulation. Accordingly, the power transmitter 100 proceeds to step 550 and stops transmitting power to the target of charging.

If the result of the comparison is included within the acceptable range in step 535, the power transmitter 100 determines the power receiver having transmitted the network subscription request message is an effective power receiver and determines whether the power receiver can subscribe to the network in step 540. More specifically, the power transmitter 100 determines whether the power receiver can subscribe to the network for wireless multi-power transmission. For example, if the power transmitter 100 determines that a number of power receivers has already reached a maximum number of targets of charging, it may be difficult for additional power receivers having transmitted the network subscription request message to join the network. Further, when a protocol version of the power receiver is greater than a protocol version of the wireless multi-power transmission network, it may be determined that the power receiver cannot subscribe to the wireless multi-power transmission network.

Accordingly, if the power receiver cannot subscribe to the network in step 540, the power transmitter 100 transmits a network subscription rejection message to the power receiver having transmitted the network subscription request message in step 545. Subsequently, the power transmitter 100 stops transmitting power to the corresponding target of charging, i.e., the power receiver having transmitted the network subscription request message in step 550. However, if the power receiver can subscribe to the network in step 540, the power transmitter 100 transmits a network subscription approval message in step 555 and then performing power transmission to the target of charging in step 560.

Figure 7A:
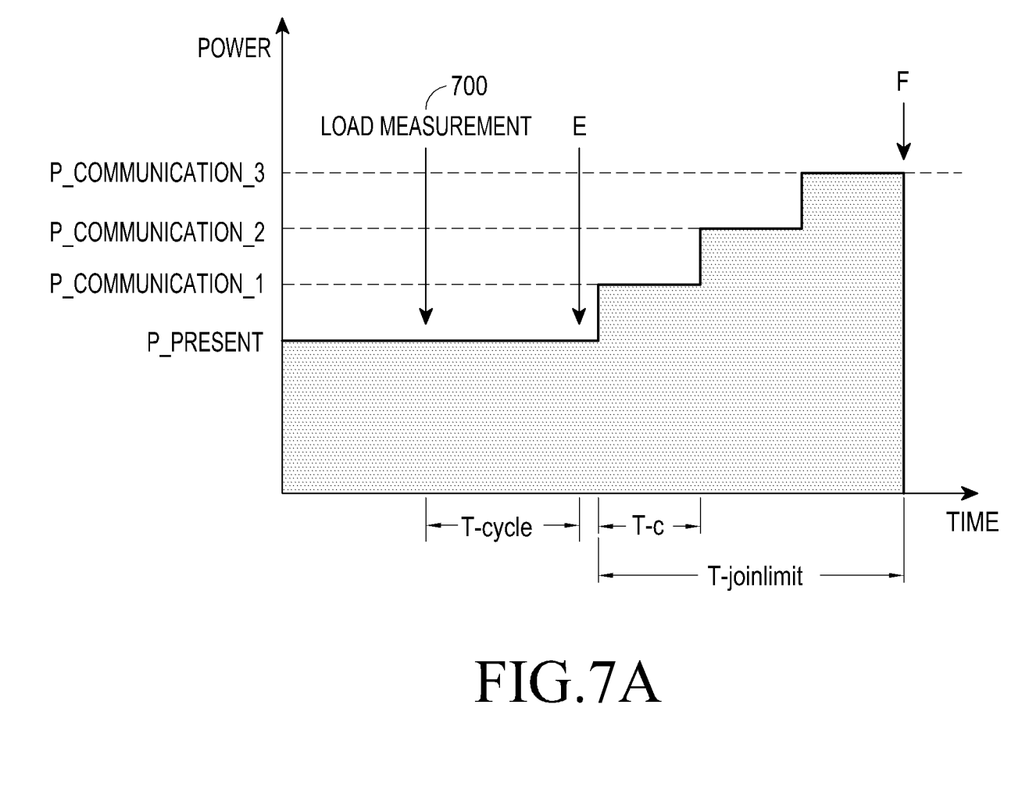
FIGS. 7A and 7B are diagrams illustrating an operation of changing a power transmission value when a target of power reception is additionally detected in a state where there is a power receiver according to an embodiment of the present invention.
Figure 7B:
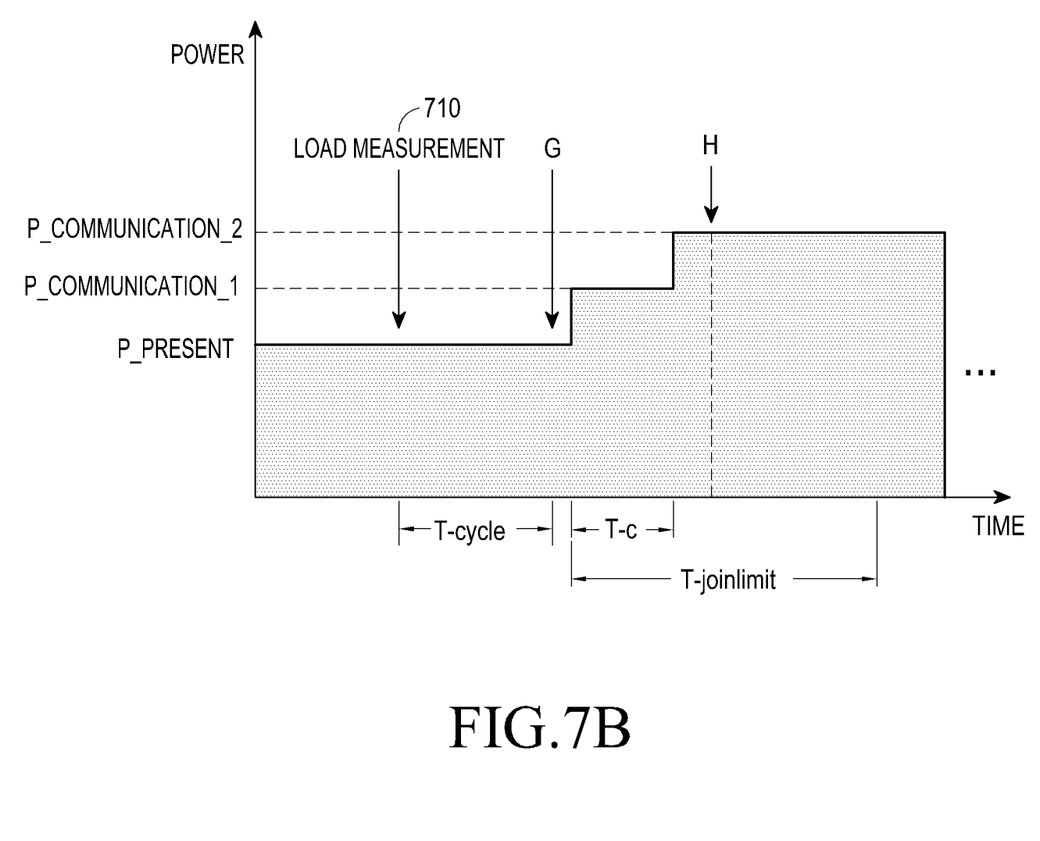

Meanwhile, as described above, FIGS. 6A and 6B illustrate an example of a power change according to whether the network subscription request message is received when it is determined that there is the target of charging in a state where there is no transmitted power, that is, the current transmission power (P_present) is "0". The power transmission for communication with each power receiver can be controlled even when there are a plurality of power receivers in the wireless multi-power transmission system as shown in FIGS. 7A and 7B. FIGS. 7A and 7B are diagrams illustrating an operation of changing a power transmission value when a target of power reception is additionally detected in a state where there is a power receiver according to an embodiment of the present invention.

FIG. 7A illustrates an example where, when the power transmitter 100 performs the load measurement 700 in transmitting power having a size of the current transmission power (P_present) to the power receiver and detects that there is a target of charging which can receive power at a time point of E, the power transmitter 100 gradually increases a transmission power value for communication with the target of charging. Similarly to FIG. 7A, FIG. 7B also illustrates an example where, when the power transmitter 100 performs the load measurement 710 and detects there is a target of charging at a time point of G, the power transmitter 100 increases a transmission power value for communication with the target of charging. However, although the transmission power value is increased from the size of the first communication power (P_communication_1) to the size of the third communication power (P_communication_3) in FIG. 7A, the network subscription request message is not received within the time limit (T_joinlimit) and thus the power transmitter 100 determines the target of charging as the non-target of power reception at a time point of F. Unlike in FIG. 7A, the transmission power value having the size of the second communication power (P_communication_2) is maintained in FIG. 7B when the network subscription request message is received at a time point of H.

According to embodiments of the present invention as described above, if the network subscription request message is not received with the time limit even though the transmission power value is gradually increased for the target of charging which makes the load change, the target of charging is determined as the non-target of power reception and thus power transmission to the target of charging is stopped. If the network subscription request message is received with the time limit as the transmission power value is gradually increased, the target of charging is determined as the normal power receiver and thus the transmission power value is maintained.

As described above, through the transmission of the changed transmission power value, sufficient power transmission required for operating the power receiver normally can be achieved.

The power transmitting method for communication with the power receiver in the wireless multi-power transmission system according to embodiments of the present invention has an advantage of supplying sufficient power to the power receiver. Further, when the power receiver does not receive sufficient power to communication with the power transmitter, the sufficient power is supplied to the power receiver through additional power transmission for the communication by the power transmitter.

Furthermore, even if multiple power receivers are located in the effective charging area at the same time or one of the multiple power receivers is not fully located within the effective charging area, sufficient power can be supplied to each power receiver and thus normal communication can be achieved.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A method of controlling power transmission of a wireless power transmitter, the method comprising:
   transmitting, by a resonator, first power for detecting a change of impedance;
   in response to the change of impedance being detected, transmitting, by the resonator, second power for communicating with a wireless power receiver;
   increasing the second power from a first magnitude to a second magnitude;
   receiving a signal from the wireless power receiver while transmitting the second power;
   in response to receiving the signal, transmitting a connection request signal to the wireless power receiver; and
   transmitting, by the resonator, third power to the wireless power receiver for charging the wireless power receiver.

2. The method as claimed in claim 1, further comprising:
   stopping transmission of the second power to the wireless power receiver in response to the signal not being received within a predetermined time.

3. The method as claimed in claim 1, further comprising:
   determining whether the wireless power receiver is capable of subscribing to a wireless multi-power transmission network using information in the signal; and
   allowing the wireless power receiver to subscribe to the wireless multi-power transmission network in response to the wireless power receiver being determined to be capable of subscribing to the wireless multi-power transmission network.

4. The method as claimed in claim 3, further comprising:
   denying subscription to the wireless power receiver to the wireless multi-power transmission network in response to the wireless power receiver being determined not to be capable of subscribing to the wireless multi-power transmission network.

5. The method as claimed in claim 4, further comprising:
   stopping transmission of the second power to the wireless power receiver in response to the wireless power receiver being denied subscription to the wireless multi-power transmission network.

6. The method as claimed in claim 1, wherein the signal comprises a protocol version of the wireless power receiver.

7. The method as claimed in claim 1, further comprising:
   comparing a measurement value corresponding to the change of the impedance with a predetermined threshold value; and
   detecting the change of the impedance in response to the measurement value being greater than or equal to the predetermined threshold value.

8. A wireless power transmitter for controlling power transmission comprising:
   a resonator; and
   a controller configured to:
   control the resonator to transmit first power for detecting a change of impedance;
       control the resonator to, in response to the change of impedance being detected, transmit second power for communicating with a wireless power receiver;
       control the resonator to increase the second power from a first magnitude to a second magnitude;
       control receiving a signal from the wireless power receiver;
       control, in response to receiving the signal, transmitting a connection request signal to the wireless power receiver; and
       control the resonator to transmit third power to the wireless power receiver for charging the wireless power receiver.

9. The wireless power transmitter claimed in claim 8, wherein the controller controls the resonator to stop transmission of the second power to the wireless power receiver in response to the signal not being received within a predetermined time.

10. The wireless power transmitter claimed in claim 8, wherein the controller determines whether the wireless power receiver is capable of subscribing to a wireless multi-power transmission network using information in the signal and allows the wireless power receiver to subscribe to the wireless multi-power transmission network in response to the wireless power receiver being determined to be capable of subscribing to the wireless multi-power transmission network.

11. The wireless power transmitter claimed in claim 10, wherein the controller denies subscription to the wireless power receiver to the wireless multi-power transmission network in response to the wireless power receiver being determined not to be capable of subscribing to the wireless multi-power transmission network.

12. The wireless power transmitter claimed in claim 11, wherein the controller controls the resonator to stop transmission of the second power in response to the wireless power receiver being denied subscription to the wireless multi-power transmission network.

13. The wireless power transmitter claimed in claim 8, wherein the signal comprises a protocol version of the wireless power receiver.

14. The wireless power transmitter claimed in claim 8, wherein the controller compares a measurement value corresponding to the change of the impedance with a predetermined threshold value and detects the change of the impedance in response to the measurement value being greater than or equal to the predetermined threshold value.

15. A method of controlling power transmission of a wireless power transmitter, the method comprising:
   transmitting, by a resonator, first power for detecting a change of impedance;
   in response to the change of impedance being detected, transmitting, by the resonator, second power for communicating with a wireless power receiver;
   increasing the second power from a first magnitude to a second magnitude;
   receiving a signal from the wireless power receiver;
   in response to receiving the signal, transmitting a connection request signal to the wireless power receiver; and
   transmitting, by the resonator, third power to the wireless power receiver for charging the wireless power receiver.

* * * * *